US010833953B2

United States Patent
Fox et al.

(10) Patent No.: US 10,833,953 B2
(45) Date of Patent: Nov. 10, 2020

(54) MANAGING ELECTRONIC COMMUNICATIONS USING A COMMUNICATION MODEL

(71) Applicant: International Business Machines Corporation, Armonk, NY (US)

(72) Inventors: Jeremy R. Fox, Georgetown, TX (US); Kelley Anders, East New Market, MD (US); Liam S. Harpur, Dublin (IE); Jonathan Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 16/188,446

(22) Filed: Nov. 13, 2018

(65) Prior Publication Data

US 2020/0153700 A1  May 14, 2020

(51) Int. Cl.
*H04L 12/24* (2006.01)
*H04L 29/08* (2006.01)
*H04L 29/06* (2006.01)
*H04L 12/58* (2006.01)
*H04L 12/46* (2006.01)
*H04L 12/861* (2013.01)
*H04L 12/26* (2006.01)

(52) U.S. Cl.
CPC .......... *H04L 41/145* (2013.01); *H04L 43/045* (2013.01); *H04L 43/08* (2013.01); *H04L 49/90* (2013.01); *H04L 51/02* (2013.01); *H04L 65/403* (2013.01); *H04L 67/306* (2013.01)

(58) Field of Classification Search
None
See application file for complete search history.

(56) References Cited

U.S. PATENT DOCUMENTS

| 7,711,779 | B2 | 5/2010 | Goodman et al. |
| 8,918,473 | B1 | 12/2014 | O'Connor |
| 9,165,329 | B2 | 10/2015 | Beechum et al. |
| 9,961,029 | B2 | 5/2018 | Dulitz et al. |
| 2005/0177461 | A1* | 8/2005 | Rosefelt ................. G06Q 30/02 705/14.69 |

(Continued)

*Primary Examiner* — Chris Parry
*Assistant Examiner* — Abderrahmen Chouat
(74) *Attorney, Agent, or Firm* — L. Jeffrey Kelly; Edell, Shapiro & Finnan, LLC (57) ABSTRACT

A computer system manages electronic communications. Topics of prior electronic communications and inter-arrival times of the prior electronic communications associated with the topics are modeled. A communication model is generated to identify electronic communications with content targeted for remediation, wherein the communication model is generated based on the modeled topics and the measured inter-arrival time of the prior electronic communications. Electronic communications for a communication session are applied to the communication model to determine one or more electronic communications for remediation. One or more remedial actions are performed on the determined one or more electronic communications to control content of the communication session. Embodiments of the present invention further include a method and program product for managing electronic communications in substantially the same manner described above.

20 Claims, 5 Drawing Sheets

(56) References Cited

U.S. PATENT DOCUMENTS

| | | | |
|---|---|---|---|
| 2010/0099444 A1* | 4/2010 | Coulter | H04L 51/12 455/466 |
| 2011/0191847 A1* | 8/2011 | Davis | G06F 15/16 726/22 |
| 2013/0041966 A1* | 2/2013 | Duan | H04L 63/0245 709/206 |
| 2016/0239581 A1* | 8/2016 | Jaidka | G06F 16/345 |
| 2019/0251166 A1* | 8/2019 | Penrose | G06F 16/3329 |
| 2020/0053111 A1* | 2/2020 | Jakobsson | H04L 51/12 |

* cited by examiner

MANAGING ELECTRONIC COMMUNICATIONS USING A COMMUNICATION MODEL

BACKGROUND

1. Technical Field

Present invention embodiments relate to managing electronic communications, and more specifically, to preemptively managing electronic communications using a communication model.

2. Discussion of the Related Art

Electronic communications may refer to any communications sent between two or more people over a network. When a user interacts on an electronic communications platform, such as a chat room, there is a risk that the user may receive unsolicited messages, commonly referred to as spam. Spammers can employ many tactics, such as disguising spam content as legitimate messages, creating chat bots that pose as human users, and sending content that contains an attack vector, such as malware. Managing electronic communications can be particularly difficult when the communications are real-time or near real-time.

SUMMARY

According to one embodiment of the present invention, a computer system manages electronic communications. Topics of prior electronic communications and inter-arrival times of the prior electronic communications associated with the topics are modeled. A communication model is generated to identify electronic communications with content targeted for remediation, wherein the communication model is generated based on the modeled topics and the measured inter-arrival time of the prior electronic communications. Electronic communications for a communication session are applied to the communication model to determine one or more electronic communications for remediation. One or more remedial actions are performed on the determined one or more electronic communications to control content of the communication session. Embodiments of the present invention further include a method and program product for managing electronic communications in substantially the same manner described above.

BRIEF DESCRIPTION OF THE DRAWINGS

Generally, like reference numerals in the various figures are utilized to designate like components.

DETAILED DESCRIPTION

Present invention embodiments relate generally to managing electronic communications, and more specifically, to preemptively managing electronic communications using a communication model. Electronic communications systems, such as real-time or near real-time messaging systems, enable multiple users to exchange messages with each other. One aspect of managing electronic communications systems is the blocking of unsolicited or malicious content. For example, human users or chat bots may send other users messages containing content such as advertisements or disguised hyperlinks that lead to phishing websites or sites hosting malware.

Present invention embodiments prevent the sending of unsolicited content by using a proactive approach, rather than a reactive approach. Messages are analyzed before they are delivered so that any messages containing unsolicited content can be managed accordingly. Conversation topics and message inter-arrival times may be analyzed to construct a communication model. The communication model may then be used to identify any messages that contain spam content while the messages are in a delivery queue, and remedial actions may be taken before the messages are delivered. By preemptively removing spam before it is delivered to end devices, present invention embodiments reduce the overall consumption of computing and network resources during communication sessions. Thus, a communication model may be used to filter electronic communications in a manner that improves the security of a communication session while also decreasing the amount of computing resources typically required to safeguard a communication session against unsolicited content.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
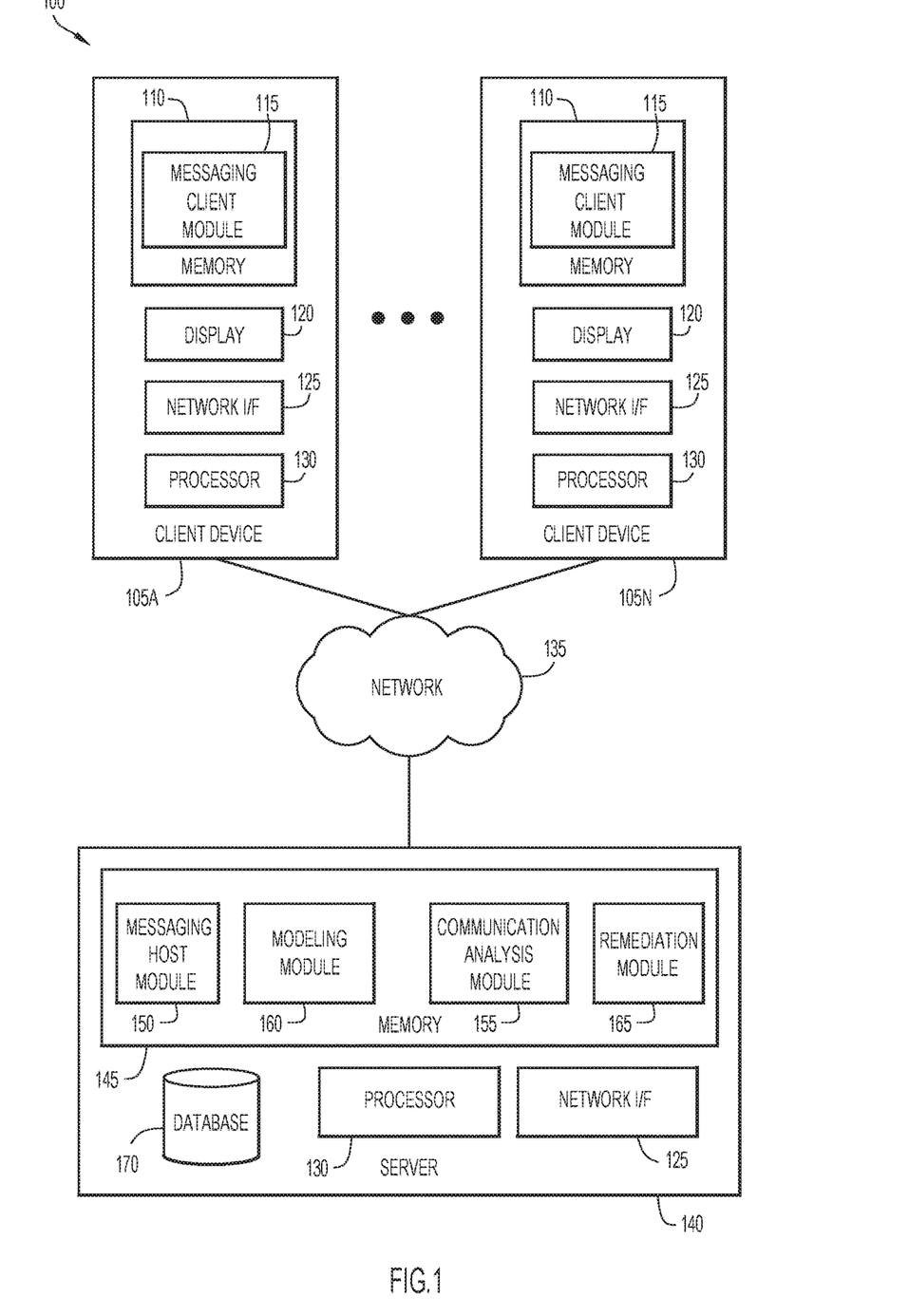
FIG. 1 is a block diagram depicting a computing environment for managing electronic communications in accordance with an embodiment of the present invention.

Present invention embodiments will now be described in detail with reference to the Figures. FIG. 1 is a block diagram depicting a computing environment 100 for managing electronic communications in accordance with an embodiment of the present invention. As depicted, computing environment 100 includes a plurality of client devices 105A-105N, a network 135, and a server 140. It is to be understood that the functional division among components of computing environment 100 have been chosen for purposes of explaining the present invention and is not to be construed as a limiting example.

Each client device 105 includes memory 110, a display 120, a network interface 125, and at least one processor 130. Memory 110 includes a messaging client module 115. In various embodiments of the present invention, each client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 125 enables components of each client device 105 to send and receive data over a network, such as network 135. Each client device 105 may include internal and external hardware components, as depicted and described in further detail with respect to FIG. 5.

Messaging client module 115 may include one or more modules or units to perform various functions of present invention embodiments described below. Messaging client module 115 may be implemented by any combination of any quantity of software and/or hardware modules or units, and may reside within memory 110 of client device 105 for execution by a processor, such as processor 130.

Messaging client module 115 may enable a user of client device 105 to participate in conversations by exchanging electronic communications on a network-accessible medium, such as a chat room, social media website, or messaging application. For example, messaging client module 115 may enable a user of client device 105A to exchange messages with a user of client device 105N. Messages exchanged by messaging client module 115 may include any form of media, such as text, images, audio, and/or video. In some embodiments, messaging client module 115 of each client device 105 indirectly exchanges messages with other devices by way of a server, such as server 140.

Display 120 may include any output device for presenting information in a visual form, such as a liquid crystal display (LCD), a cathode ray tube (CRT) display, or a light-emitting diode (LED) display. Display 120 may enable a user of client device 105A to view electronic communications received from users of other client devices, such as client device 105N.

Network 135 may include a local area network (LAN), a wide area network (WAN) such as the Internet, or a combination of the two, and includes wired, wireless, or fiber optic connections. In general, network 135 can be any combination of connections and protocols that will support communications between user devices 105A-105N and server 140 via their respective network interfaces 125 in accordance with embodiments of the present invention.

Server 140 includes memory 145, a network interface 125, at least one processor 130, and a database 170. Memory 145 may include a messaging host module 150, a communication analysis module 155, a modeling module 160, and a remediation module 165. In general, server 140 manages electronic communications by identifying and remediating unsolicited communications. Server 140 may include internal and external hardware components, as depicted and described in further detail with respect to FIG. 5.

Messaging host module 150, communication analysis module 155, modeling module 160, and remediation module 165 may include one or more modules or units to perform various functions of present invention embodiments described below. Messaging host module 150, communication analysis module 155, modeling module 160, and remediation module 165 may be implemented by any combination of any quantity of software and/or hardware modules or units, and may reside within memory 145 of server 140 for execution by a processor, such as processor 130.

Messaging host module 150 may host a messaging service to facilitate the exchange of electronic communications between two or more conversation participants. Each conversation participant may be associated with a client device 105 and may send and receive messages with users of other client devices 105. When an incoming message is received, messaging host module 150 may hold the message in a queue until the message is processed by one or more other modules of server 140. Depending on factors such as the content of the message, the sender and/or recipient, and any remedial actions potentially taken by server 140, messaging host module 150 may send the message to one or more client devices 105, may alter the message prior to sending, or may discard the message.

Communication analysis module 155 may analyze messages routed via messaging host module 150, including the content of messages and any metadata associated with messages. Communication analysis module 155 may determine inter-arrival times of messages, which refers to the amount of time between the arrival of a first message and the arrival of a second message at server 140. An inter-arrival time may be a measure of the amount of time between two messages sent by the same user, or the amount of time between two messages sent by any user. For example, in some embodiments, the inter-arrival time is the time between arrival of a first message sent by a user and a second message sent by the same user. In other embodiments, the inter-arrival time may correspond to a measure of time that spans from the arrival of a first message sent by any user and the arrival of a next message sent by the same user or a different user. Thus, in various embodiments, the inter-arrival time may represent how quickly a single user is sending messages in succession, or how quickly a user is sending a message after another user has sent a message.

Communication analysis module 155 may also analyze messages to identify one or more topics of discussion. Conventional or other topic modeling techniques may be employed in order to identify a topic of discussion. In some embodiments, a Biterm topic model is used to identify topics of discussion. Additionally or alternatively, conventional or other machine learning techniques may be utilized to identify topics based on the text content of messages, including conventional neural network (CNN) approaches and/or recurrent neural network (RNN) approaches.

Modeling module 160 may generate one or more communication models that can evaluate a message in order to determine the likelihood that the message contains unsolicited content, such as spam. Modeling module 160 may construct an inter-arrival time distribution according to the frequencies of inter-arrival times. For example, an inter-arrival time distribution may show that, during a conversation oriented toward a particular topic, three measured inter-arrival times are around five seconds, and two inter-arrival times are seven seconds. Inter-arrival times may be rounded to a nearest value, such as the nearest second, nearest microsecond, and the like, in order to identify frequencies of inter-arrival time that do not differ significantly. For example, modeling module 160 may consider an inter-arrival time of 7.2 seconds and an inter-arrival time of 6.9 seconds to both count toward the frequency of seven-second inter-arrival times. Alternatively, an inter-arrival time distribution may group inter-arrival times using a time range. For example, inter-arrival times that fall between zero and 0.5 seconds may be placed in a first group, inter-arrival times that fall between 0.5 seconds and 1.0 seconds may be placed in a second group, and the like. Thus, an inter-arrival time distribution represents the density of inter-arrival time values by grouping values according to time duration. Each communication model may include one or multiple topics of conversation, such as topics that are identified by communication analysis module 155. In some embodiments, modeling module 160 generates an inter-arrival time distribution for each user for a given topic of conversation.

Once modeling module 160 generates one or more inter-arrival time distributions, the distributions may be used as part of a communication model to evaluate risk of a message. Using conventional or other machine learning techniques, specific inter-arrival time distributions and/or portions of distributions may be associated with undesired content, such as unsolicited messages. Once an inter-arrival time distribution is associated with undesired content, modeling module 160 may evaluate a user's messages in order to determine the likelihood that any of the messages are spam. In some embodiments, modeling module 160 compares a message to a communication model to generate a probability statistic that measures the likelihood that a message is spam. Modeling module 160 may develop a communication model that is embodied as part of a NoSQL schema, with probabilistic scoring being surfaced as part of the schema. The communication model may be embodied as one or more microservices running on server 140.

Remediation module 165 may identify messages that are likely to be unsolicited, and performs one or more remedial actions. Remediation module 165 may identify messages that are targets for remediation by comparing the probability that a message is spam to a predetermined threshold value. For example, if modeling module 160 determines that a particular message has an 85% likelihood of being spam, and the threshold value is 80%, then remediation module 165 may flag the message as spam while the message is held in a message queue. Remediation module 165 may use a specific threshold value for each topic of discussion. For example, for one topic, a message may be required to have at least a 90% probability of being spam in order to be targeted for remediation, whereas for another topic, a message having a 75% likelihood of being spam may be targeted for remediation.

Once remediation module 165 identifies a message to be targeted for remediation, one or more actions may be performed. Identified messages may simply be discarded so that they are not sent to any users. In some embodiments, the content of an identified message may be altered. For example, a message may be altered in some manner to indicate that the message has been censored, or any hyperlinks contained in the message may be removed (or converted to plain text). Additionally or alternatively, remediation module 165 may send a notification to the user who is the sender of the identified message. For example, remediation module 165 may notify the sender that the sender's message was removed or censored. In some embodiments, remediation module 165 will temporarily or permanently ban a user account that is responsible for one or more messages that have been targeted for remediation.

Database 170 may include any non-volatile storage media known in the art. For example, database 170 can be implemented with a tape library, optical library, one or more independent hard disk drives, or multiple hard disk drives in a redundant array of independent disks (RAID). Similarly, data on database 170 may conform to any suitable storage architecture known in the art, such as a file, a relational database, an object-oriented database, and/or one or more tables. Database 170 may store data corresponding to one or more communication models for evaluating messages, including inter-arrival time distributions.

Figure 2:
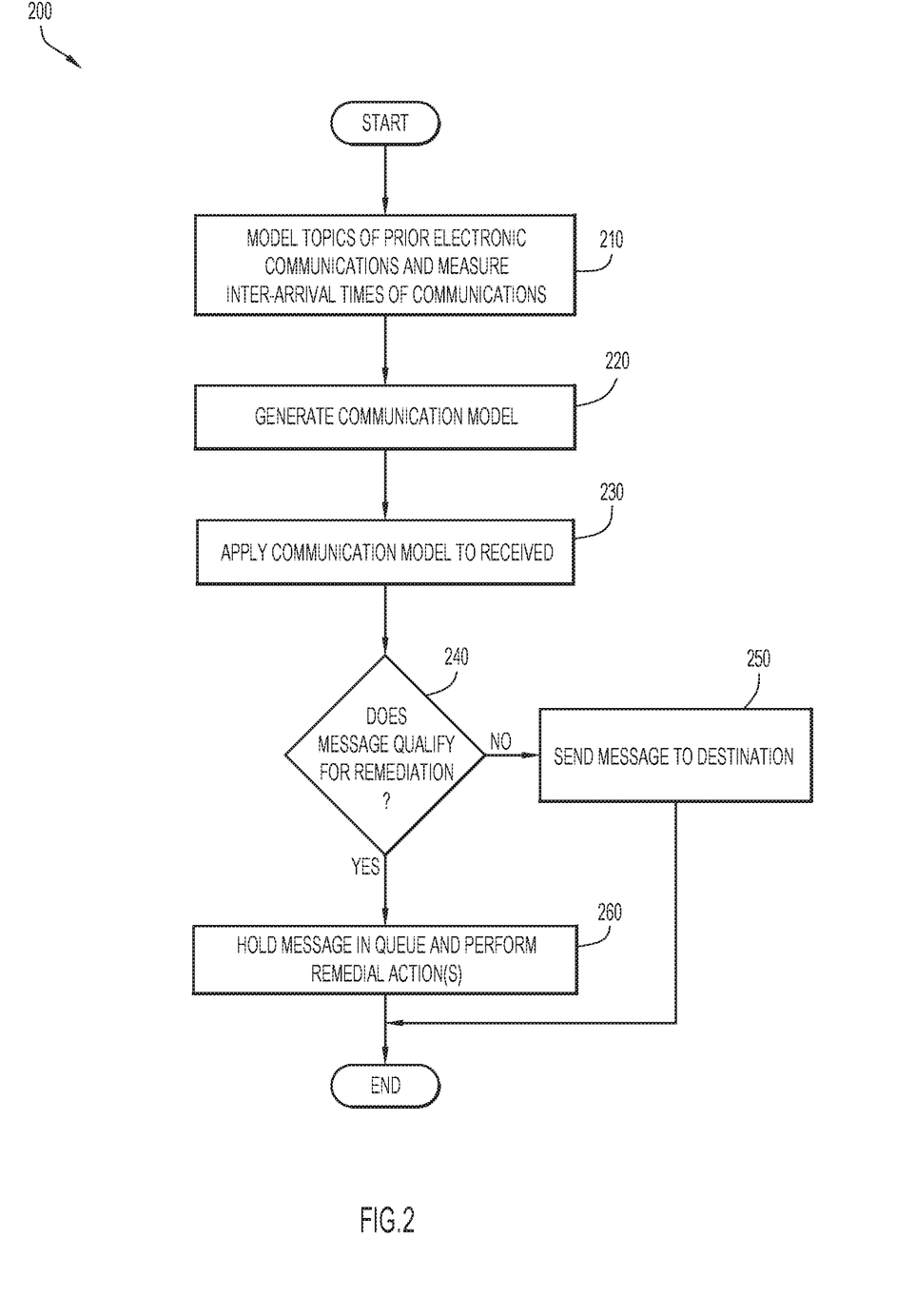
FIG. 2 is a flow chart depicting a method of managing electronic communications in accordance with an embodiment of the present invention.

FIG. 2 is a flow chart depicting a method 200 of managing electronic communications in accordance with an embodiment of the present invention.

Topics of prior electronic communications are modeled and inter-arrival times of communications are measured at operation 210. Electronic communications may comprise multiple messages exchanged between two or more individuals, such as users of client devices 105A-105N. Messages may be collected and analyzed in order to determine the topics of the messages. In some embodiments, communication analysis module 155 analyzes messages using conventional or other topic modeling techniques. Communication analysis module 155 may also measure the inter-arrival times between messages, which is the amount of time between the arrival of a first message and the arrival of a second message. For example, for every N messages, there are N−1 measurable inter-arrival times.

A communication model is generated at operation 220. Modeling module 160 may generate a communication model that comprises one or more inter-arrival time distributions. Modeling module 160 may then correlate particular distributions with the distributions that are expected to be associated with unsolicited messages. Modeling module 160 may be trained using supervised or unsupervised machine learning techniques. Each inter-arrival time distribution may reflect a density of communications by topic and by inter-arrival time.

The communication model is applied to a received message at operation 230. Received communications may include any messages received during a communication session. A communication session may include any real-time or near real-time chat session. Each message may be held in a message queue as the communication model is applied to evaluate the risk of the message. For example, messages from a same user may be plotted as an inter-arrival time distribution, and that distribution may be compared to other distributions that are selected based on the identified subject(s) of conversation. Modeling module 160 may then determine a probability that a message from a user is spam by comparing the topic of the message and the inter-arrival time associated with the message to one or more inter-arrival time distributions in the communication model that are associated with unsolicited messages in order to calculate the likelihood that a message is spam. Thus, modeling module 160 may calculate a probability for each message that indicates the likelihood of a given message being spam. In some embodiments, application of a communication model may be performed using a crowdsourcing approach. For example, the communication model may be trained by crowdsourcing the decision of which inter-arrival time distribution(s) to use when evaluating a message.

Operation 240 determines whether a particular message qualifies for remediation. Remediation module 165 may compare the probability value of a message being spam to a particular threshold in order to determine whether the message should be targeted for remediation. If the probability of a message being spam exceeds a threshold, the message may be held in the message queue so that one or more remedial actions can be performed at operation 260. Otherwise, the message may be sent from server 140 to the intended destination, such as client device 105N, at operation 250.

When a message's probability of being spam surpasses a threshold, the message is held in the message queue so that one or more remedial actions may be performed at operation

260. Remedial actions may include deletion of the message or alteration of the message. In some embodiments, the user account from which the message originated may be notified of the remedial action, sent a warning message, and/or may be removed or muted from the communication session temporarily or permanently.

In some embodiments, remediation actions may change over time based on factors such as the users in a communication session and the topic(s) of conversation. A remedial action may be selected based on a profiling of the users participating in a communication session. Modeling module 160 may analyze users' prior post histories to determine which user profiles align more closely with a probability to attract potential spam. Remedial actions may then be selected based on the profiling of users in the communication session. For example, if the users tend to receive more spam, then stricter remedial actions may be implemented, such as more readily banning user accounts that are associated with spam. In some embodiments, user accounts may not be banned until a number of violations, with the number of violations being based on the profiles of the other users. For example, if users are particularly unlikely to attract spam, then an account sending spam messages may not be banned until five messages are identified for remediation, whereas if users are particularly likely to attract spam, then an account sending spam messages may be banned after sending only one or two messages that are identified for remediation. Additionally or alternatively, the selection of a particular remediation action may be made according to a crowdsourced approach. For example, users may be tasked with the selection of a remediation action that each user believes to be commensurate to the activities of the user sending messages that have been targeted for remediation, and remediation module 165 may be trained accordingly.

Figure 3:
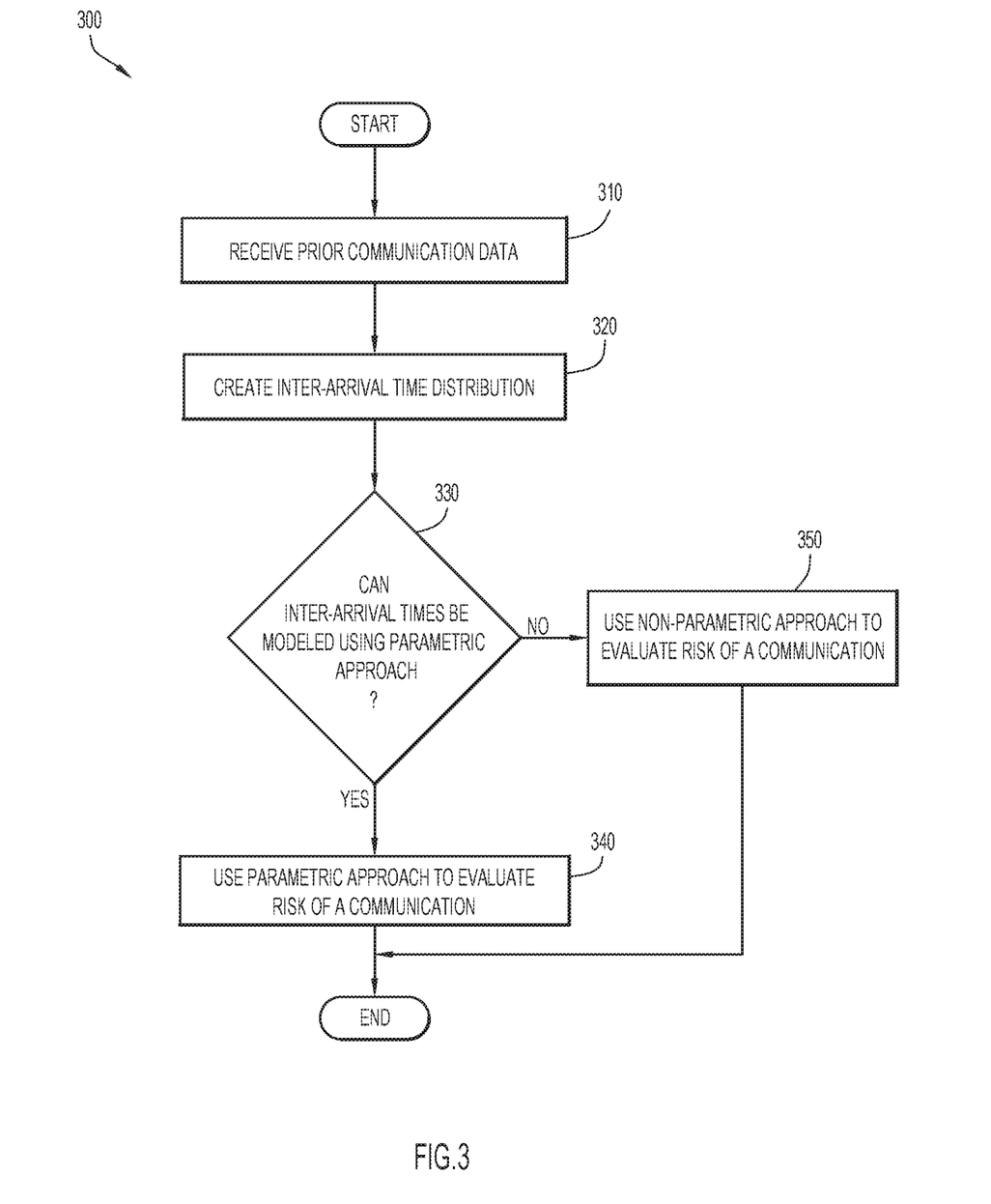
FIG. 3 is a flow chart depicting a method of generating a communication model in accordance with an embodiment of the present invention.

FIG. 3 is a flow chart depicting a method 300 of generating a communication model in accordance with an embodiment of the present invention.

Prior communication data is received at operation 310. Prior communication data may include any messages previously exchanged in one or more communication sessions, including metadata such as the arrival times of the messages.

An inter-arrival time distribution is created at operation 320. Inter-arrival times may be calculated between messages and added to a distribution that indicates the density of inter-arrival times by time duration, thus defining a probability density function. For example, an inter-arrival time distribution may indicate how many inter-arrival times were between zero and 0.5 seconds, between 0.5 and 1.0 seconds, between 1.0 and 1.5 seconds, and the like.

Operation 330 determines whether the inter-arrival time distribution can be modeled using a parametric approach. If the distribution can be modeled according to a parametric approach, operation 340 uses a communication model that evaluates the risk of a message by analyzing the moments of the inter-arrival time distribution. For example, if the inter-arrival time of messages can be modeled using a Pareto distribution, the outputs of a topic model may be overlaid onto the distribution. If the distribution cannot be modeled according to a parametric approach, operation 350 uses a non-parametric approach, such as kernel density estimation, using the bandwidth selection to evaluate risk. Operation 340 or operation 350 may output a probability value that indicates the likelihood of a message containing unsolicited content. When a communication model is constructed, a visual representation may be generated so that an administrator may identify trends in the electronic communications being targeted for remediation, such as the probability values of messages being spam.

Once a communication model is generated, the model may be generalized for other topics. For example, a communication model may be generalized relative to one or more other chat corpora that represent other fields of study. Generalized models may then be used as starting points for communication models that may be refined using machine learning.

Figure 4:
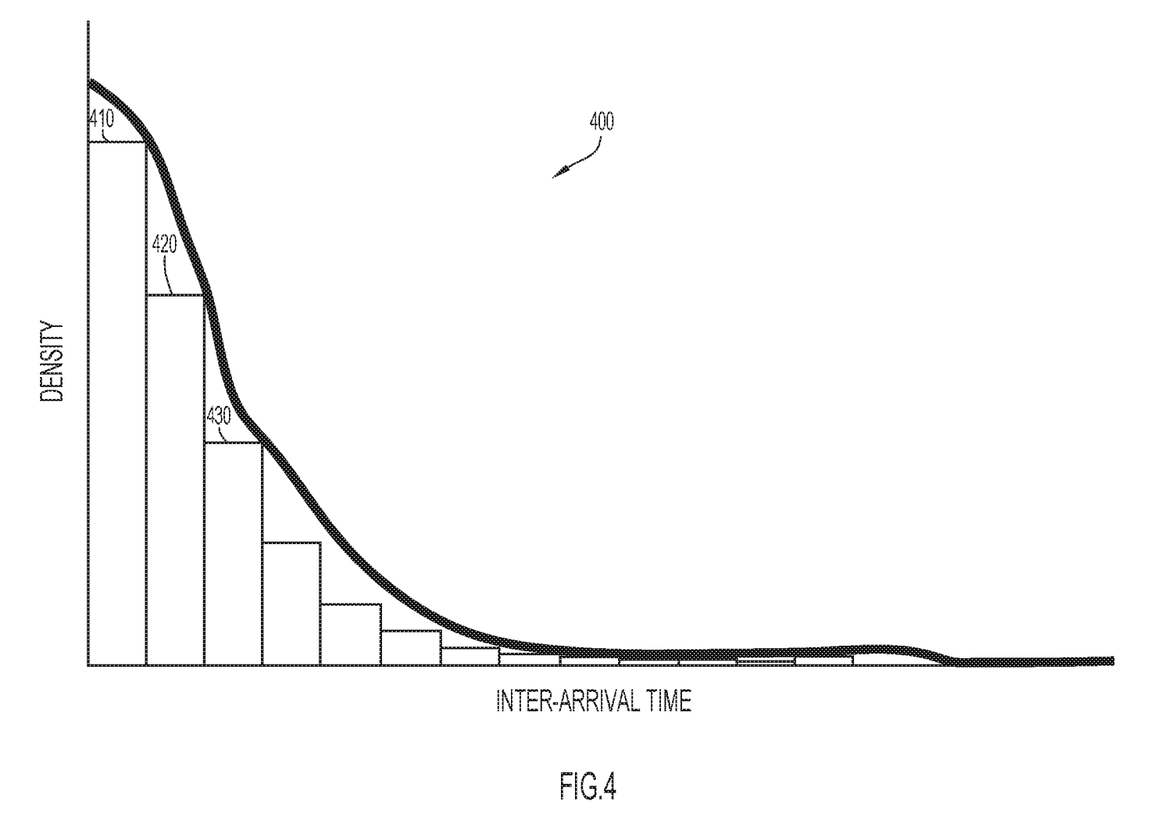
FIG. 4 is a diagram depicting an inter-arrival time distribution in accordance with an embodiment of the present invention.

FIG. 4 is a diagram depicting an inter-arrival time distribution 400 in accordance with an embodiment of the present invention. As depicted, distribution 400 includes an inter-arrival time axis and a density axis. Inter-arrival times are categorized according to their durations, and as more inter-arrival times are measured and added to a same group, the density of the group increases (as indicated by the y-axis values). For example, inter-arrival time group 410 may represent the number of inter-arrival times between zero and two seconds, inter-arrival time group 420 may represent the number of inter-arrival times between two and four seconds, and inter-arrival time group 430 may represent the number of inter-arrival times between four and six seconds. As depicted, inter-arrival time group 410 has approximately twice the density of inter-arrival time group 430, meaning that twice as many inter-arrival times fell between zero and two seconds as did between four and six seconds. In some embodiments, an inter-arrival time distribution, such as inter-arrival time distribution 400, is generated for each topic of discussion. Additionally or alternatively, there may be a baseline of inter-arrival time distributions per platform or chat room regardless of topic, or a baseline of inter-arrival time distributions by user.

Figure 5:
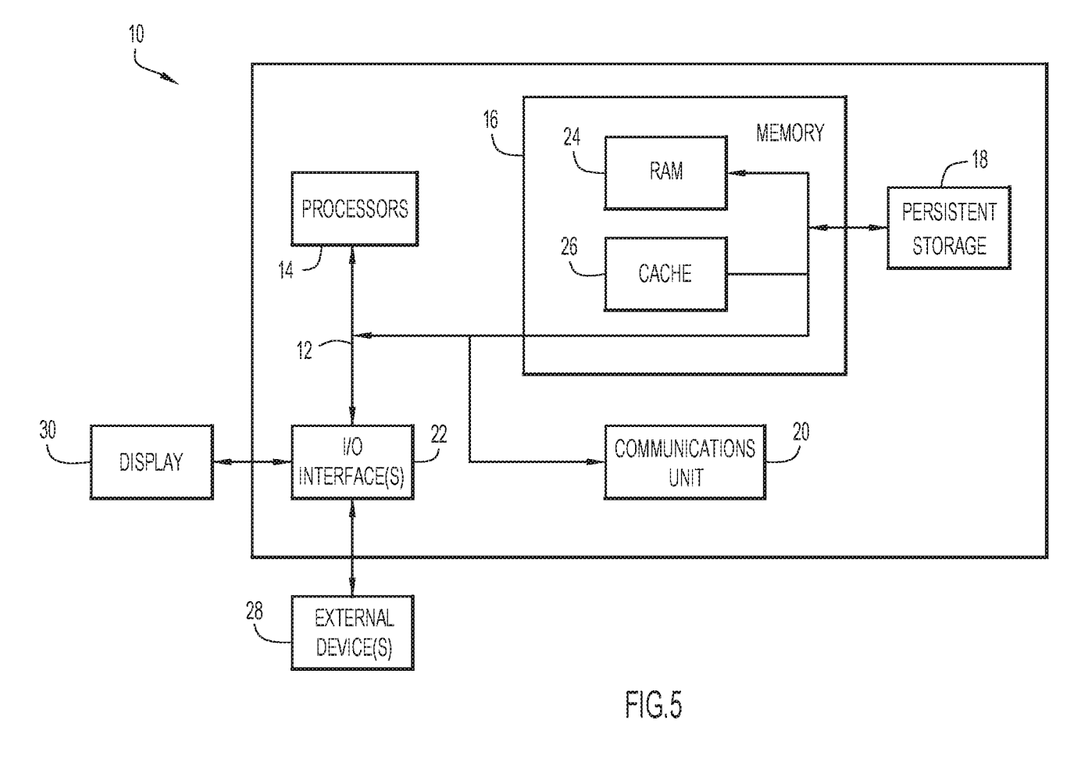
FIG. 5 is a block diagram depicting a computing device in accordance with an embodiment of the present invention.

FIG. 5 is a block diagram depicting components of a computer 10 suitable for executing the methods disclosed herein. Computer 10 may implement client devices 105A-105N and/or server 140 in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to managing electronic communications, such as message data, inter-arrival time data, user data, communication model data, remediation data, and the like, may be stored within any conventional or other data structures, such as files, arrays, lists, stacks, queues, records, and the like. Data relating to managing electronic communications may be stored in any desired storage unit, such as a database, data or other repositories, queue, and the like. The data transmitted between user devices 105A-105N and server 140 may include any desired format and arrangement, and may include any quantity of any types of fields of any size to store the data. The definition and data model for any datasets may indicate the overall structure in any desired fashion, including, for example, computer-related languages, graphical representation, listing, and the like.

Data relating to managing electronic communications, such as message data, inter-arrival time data, user data, communication model data, remediation data, and the like, may include any information provided to, or generated by, user devices 105A-105N and/or server 140. Data relating to managing electronic communications may include any desired format and arrangement, and may include any quantity of any types of fields of any size to store any desired data. The data relating to managing electronic communications may include any data collected about entities by any collection mechanism, any combination of collected information, and any information derived from analyzing collected information.

The present invention embodiments may employ any number of any type of user interface, such as a Graphical User Interface (GUI), command-line, prompt, and the like, for obtaining or providing information, where the interface may include any information arranged in any fashion. The interface may include any number of any types of input or actuation mechanisms, such as buttons, icons, fields, boxes, links, and the like disposed at any locations to enter/display information and initiate desired actions. Any suitable input devices, such as a mouse, keyboard, and the like, may be used to enter information and initiate actions. The interface screens may include any suitable actuators, such as links, tabs, and the like, to navigate between the screens in any fashion.

It will be appreciated that the embodiments described above and illustrated in the drawings represent only a few of the many ways of managing electronic communications.

The environment of the present invention embodiments may include any number of computer or other processing systems, such as client or end-user systems, server systems, and the like, and databases or other repositories arranged in any desired fashion. The present invention embodiments may be applied to any desired type of computing environment, such as a cloud computing environment, a client-server environment, a network computing environment, a mainframe, stand-alone systems, and the like. The computer or other processing systems employed by the present invention embodiments may be implemented by any number of any personal or other type of computer or processing system, such as a desktop, laptop, PDA, mobile device, and the like, and may include any commercially available operating system and any combination of commercially available and custom software, such as messaging client module 115, messaging host module 150, communication analysis module 155, modeling module 160, remediation module 165, and the like. These systems may include any types of monitors and input devices, such as a keyboard, mouse, voice recognition, and the like, to enter and/or view information.

It is to be understood that the software of the present invention embodiments, including messaging client module 115, messaging host module 150, communication analysis module 155, modeling module 160, and remediation module 165, may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium, such as LAN, WAN, Intranet, Internet, hardwire, modem connection, wireless, and the like. For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments, including messaging client module 115, messaging host module 150, communication analysis module 155, modeling module 160, remediation module 165, and the like, may be available on a non-transitory computer usable medium, such as magnetic or optical mediums, magneto-optic mediums, floppy diskettes, CD-ROM, DVD, memory devices, and the like, of a stationary or portable program product apparatus or device for use with stand-alone systems or systems connected by a network or other communications medium.

The communication network may be implemented by any number of any type of communications network, including, for example, LAN, WAN, Internet, Intranet, VPN, and the like. The computer or other processing systems of the present invention embodiments may include any conventional or other communications devices to communicate over the network via any conventional or other protocols. The computer or other processing systems may utilize any type of connection, including any wired, wireless, or fiber optic connections, for access to the network. Local communication media may be implemented by any suitable communication media, including local area network (LAN), hardwire, wireless link, Intranet, and the like.

The system may employ any number of any conventional or other databases, data stores or storage structures, such as files, databases, data structures, data or other repositories, and the like, to store information. The database system may be implemented by any number of any conventional or other databases, data stores or storage structures to store information, including any data relating to managing electronic communications. The database system may be included within or coupled to the server and/or client systems. The database systems and/or storage structures may be remote from or local to the computer or other processing systems, and may store any desired data, such as data relating to managing electronic communications.

The present invention embodiments may employ any number of any type of user interface, such as a Graphical User Interface (GUI), command-line, prompt, and the like, for obtaining or providing information, where the interface may include any information arranged in any fashion. The interface may include any number of any types of input or actuation mechanisms, such as buttons, icons, fields, boxes, links, and the like, disposed at any locations to enter/display information and initiate desired actions via any suitable input devices, such as a mouse, keyboard, and the like. The interface screens may include any suitable actuators, including links, tabs, and the like, to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of managing electronic communications comprising:
    modeling, via a processor, topics of prior electronic communications and measuring inter-arrival time of the prior electronic communications associated with the topics;
    generating, via the processor, a communication model to identify electronic communications with content targeted for remediation, wherein the communication model is generated based on the modeled topics and the measured inter-arrival time of the prior electronic communications;
    applying, via the processor, electronic communications for a communication session to the communication model to determine one or more electronic communications for remediation; and
    performing, via the processor, one or more remedial actions on the determined one or more electronic communications to control content of the communication session.

2. The computer-implemented method of claim 1, wherein the communication session includes a chat session, and the determined one or more electronic communications for remediation each include spam.

3. The computer-implemented method of claim 1, wherein performing the one or more remedial actions further comprises:
    adjusting, via the processor, the one or more remedial actions based on profiling users participating in the communication session.

4. The computer-implemented method of claim 1, wherein the communication model determines a probability of an electronic communication being targeted for remediation.

5. The computer-implemented method of claim 4, wherein the communication model determines the probability based on a density measurement of a number of electronic communications and a topic.

6. The computer-implemented method of claim 1, further comprising:
    generalizing, via the processor, the communication model for use between communication spaces.

7. The computer-implemented method of claim 1, further comprising:
    visualizing, via the processor, the communication model in a graphical form to indicate trends in probabilities for electronic communications being targeted for remediation.

8. A computer system for managing electronic communications, the computer system comprising:
   one or more computer processors;
   one or more computer readable storage media;
   program instructions stored on the one or more computer readable storage media for execution by at least one of the one or more computer processors, the program instructions comprising instructions to:
   model topics of prior electronic communications and measure inter-arrival time of the prior electronic communications associated with the topics;
   generate a communication model to identify electronic communications with content targeted for remediation, wherein the communication model is generated based on the modeled topics and the measured inter-arrival time of the prior electronic communications;
   apply electronic communications for a communication session to the communication model to determine one or more electronic communications for remediation; and
   perform one or more remedial actions on the determined one or more electronic communications to control content of the communication session.

9. The computer system of claim 8, wherein the communication session includes a chat session, and the determined one or more electronic communications for remediation each include spam.

10. The computer system of claim 8, wherein the program instructions to perform the one or more remedial actions further comprise instructions to:
    adjust the one or more remedial actions based on profiling users participating in the communication session.

11. The computer system of claim 8, wherein the communication model determines a probability of an electronic communication being targeted for remediation.

12. The computer system of claim 11, wherein the communication model determines the probability based on a density measurement of a number of electronic communications and a topic.

13. The computer system of claim 8, further comprising instructions to:
    generalize the communication model for use between communication spaces.

14. The computer system of claim 8, further comprising instructions to:
    visualize the communication model in a graphical form to indicate trends in probabilities for electronic communications being targeted for remediation.

15. A computer program product for managing electronic communications, the computer program product comprising one or more computer readable storage media collectively having program instructions embodied therewith, the program instructions executable by a computer to cause the computer to:
    model topics of prior electronic communications and measure inter-arrival time of the prior electronic communications associated with the topics;
    generate a communication model to identify electronic communications with content targeted for remediation, wherein the communication model is generated based on the modeled topics and the measured inter-arrival time of the prior electronic communications;
    apply electronic communications for a communication session to the communication model to determine one or more electronic communications for remediation; and
    perform one or more remedial actions on the determined one or more electronic communications to control content of the communication session.

16. The computer program product of claim 15, wherein the communication session includes a chat session, and the determined one or more electronic communications for remediation each include spam.

17. The computer program product of claim 15, wherein the program instructions to perform the one or more remedial actions further comprise instructions to:
    adjust the one or more remedial actions based on profiling users participating in the communication session.

18. The computer program product of claim 15, wherein the communication model determines a probability of an electronic communication being targeted for remediation.

19. The computer program product of claim 15, wherein the communication model determines the probability based on a density measurement of a number of electronic communications and a topic.

20. The computer program product of claim 15, further comprising instructions to:
    generalize the communication model for use between communication spaces.

* * * * *